3,068,276
AMINOBICYCLOHEPTENE/CARBOXYLATES AND AMINOTRICYCLOHEPTANE CARBOXYLATES
Lee A. Miller, Dayton, Ohio, assignor to Monsanto Chemical Company, St. Louis, Mo., a corporation of Delaware
No Drawing. Filed Oct. 7, 1960, Ser. No. 61,068
14 Claims. (Cl. 260—468)

This invention relates to alicyclic amino esters and to the method of preparing the same.

According to the invention there are provided certain new and valuable amino-substituted 5-norbornene-2-carboxylates and tricycloheptanecarboxylates by the addition reaction of a primary or secondary amine with an alkyl 2,5-norbornadiene-2-carboxylate. The addition reaction proceeds with formation of a mixture of the norbornene compound (I) and of the isomeric tricycloheptane compound (II), thus:

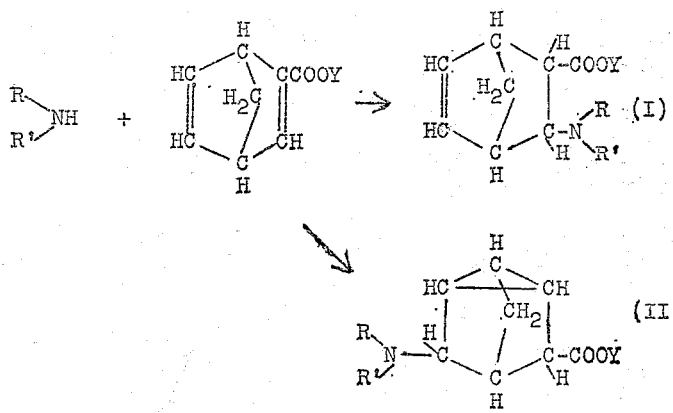

in which R is a hydrocarbyl radical which is free of olefinic and acetylenic unsaturation and contains from 1 to 8 carbon atoms, R' is selected from the class consisting of R and hydrogen, and Y is an alkyl radical of from 1 to 5 carbon atoms.

The alkyl 2-5-norbornadiene-2-carboxylates are obtainable in known manner by reaction of cyclopentadiene with an alkyl propiolate. The presently useful carboxylates include the methyl, ethyl, propyl, isopropyl, butyl, isobutyl, tert-butyl, pentyl, isopentyl and tert-pentyl 2,5-norbornadiene-2-carboxylates.

The presently useful amines are primarily hydrocarbylamines such as methyl-, ethyl-, propyl-, isopropyl-, butyl-, tert-butyl-, pentyl-, tert-pentyl-, hexyl-, heptyl-, octyl-, 2-ethylhexyl, benzyl-, 4-ethylbenzyl or 2-phenylethylamine, aniline, o-, m- or p-toluidine, 2,3-, 2,4-, 2,5-, 2,6-, 3,4- or 3,5-xylidine, o-, m- or p-ethylaniline, cyclopentylamine, cyclopropylamine, cyclohexylamine or 2-methylcyclopentylamine; and the secondary, dihydrocarbylamines such as dimethyl-, diethyl-, diisopropyl-, dipropyl-, dibutyl-, di-tert-butyl-, dipentyl-, dihexyl-, diheptyl-, bis(2-ethylhexyl)-, dioctyl-, ethylmethyl-, butylpropyl-, dibenzyl-, bis(2-phenylethyl)-, diphenyl-, di-p-tolyl-, bis(2-ethylphenyl)-, phenylpropyl-, dicyclopentyl-, dicyclohexyl-, butylcyclohexyl- or bis(4-methylbenzyl)-amine.

Reaction of the alkyl 2,5-norbornadiene-2-carboxylates with the primary or secondary amine to give the mixture of the isomeric alkyl 3-(hydrocarbyl or dihydrocarbyl amino)-5-norbornene-2-carboxylate (I) and alkyl 5-(hydrocarbyl or dihydrocarbyl amino)tricyclo[2.2.1.0$^{2,6}$]heptane-3-carboxylate (II) takes place readily by simply contacting the norbornadiene-carboxylate with the amine at ordinary or increased temperatures and in the presence or absence of an inert diluent or solvent. Advantageously, when a diluent is used, reaction is effected by heating at a temperature of from, say, 50° C. to 125° C. Operation at the refluxing temperature of the reaction mixture is conveniently employed when a diluent or solvent is used. Inert liquids which are useful as the reaction media are the liquid hydrocarbons generally, halogenated hydrocarbons, ethers, or the lower fatty acids, e.g., benzene, toluene, xylene, hexane, petroleum spirits, dichlorobenzene, ethylene dichloride, carbon tetrachloride, tetrachlorobenzene, dioxane, glacial acetic acid, isopropyl ether, etc. Generally, any organic material which is non-reactive with either the reactants or the products may be used. Since the reaction occurs by addition of one mole of the amine to one mole of the dienic compound, these reactants are advantageously employed in such stoichiometric proportions. However, an excess of the dienic component may be used.

Although I do not know the exact mechanism underlying the formation of the mixture of alkyl 2-(hydrocarbyl or hydrocarbyl amino)-5-norbornene-2-carboxylate (I) and the alkyl 2-(hydrocarbyl or dihydrocarbyl amino)-tricyclo[2.2.1.0$^{2,6}$]heptane-3-carboxylate (II), it is believed that addition of the primary or secondary amine to the dienic compound takes place at the 2,3-olefinic bond in one instance and by conjugate addition in the second instance. The mixture of (I) and (II) which is obtained may be used directly for some purposes, e.g., as a vulcanization accelerator for natural and synthetic rubbers. However, (I) and (II) are readily separated from each other by easy fractional distillation because the boiling points thereof are sufficiently far apart to permit it.

Examples of the presently provided compounds and of the amine and alkyl 2,5-norbornadiene-2-carboxylate from which they are obtained according to this invention are shown below, wherein the 2,5-norbornadiene nucleus of the starting dienic carboxylate is denoted as "D," the 5-norbornene nucleus of the olefinic product (I) is denoted as "X" and the tricyclo[2.2.1.0$^{2,6}$]heptane nucleus of the saturated product is denoted as "Z":

Propyl 3-dimethylamino-X-2-carboxylate and propyl 5-dimethylamino-Z-3-carboxylate from dimethylamine and propyl D-2-carboxylate.

Butyl 3-phenylamino-X-2-carboxylate and butyl 5-phenylamino-Z-3-carboxylate from aniline and butyl D-2-carboxylate.

Ethyl 3-cyclohexylamino-X-2-carboxylate and ethyl 5-cyclohexylamino-Z-3-carboxylate from cyclohexylamine and ethyl D-2-carboxylate.

Methyl 3-benzylamino-X-2-carboxylate and methyl 5-benzylamino-Z-3-carboxylate from benzylamine and methyl D-2-carboxylate.

Pentyl 3-di-p-tolylamino-X-2-carboxylate and pentyl 5-di-p-tolylamino-Z-3-carboxylate from di-p-tolylamine and pentyl D-2-carboxylate.

Isopropyl 3-ethylmethylamino-X-2-carboxylate and isopropyl 5-ethylmethylamino-Z-3-carboxylate from ethylmethylamine and isopropyl D-2-carboxylate.

Tert-butyl 3-diphenylamino-X-2-carboxylate and tert-butyl 5-diphenylamino-Z-3-carboxylate from diphenylamine and tert-butyl D-2-carboxylate.

Methyl 3-(4-ethylphenyl)amino-X-2-carboxylate and methyl 5-(4-ethylphenyl)amino-Z-3-carboxylate from 4-ethylaniline and methyl D-2-carboxylate.

Tert-pentyl 3-cyclohexylpropylamino-X-2-carboxylate and tert-pentyl 5-cyclohexylpropylamino-Z-3-carboxylate from cyclohexylpropylamine and tert-pentyl D-2-carboxylate.

Methyl 3-diisopropylamino-X-2-carboxylate and methyl 5-diisopropylamino-Z-3-carboxylate from diisopropylamine and methyl D-2-carboxylate.

Ethyl 3-[bis(2-ethylhexyl)amino]-X-2-carboxylate and ethyl 5-[bis(2-ethylhexyl)amino]-Z-3-carboxylate from bis(2-ethylhexyl)amine and ethyl D-2-carboxylate.

Methyl 3-dibenzylamino-X-2-carboxylate and methyl 5-dibenzylamino-Z-3-carboxylate from dibenzylamine and methyl D-2-carboxylate.

Pentyl 3-cyclopropylamino-X-2-carboxylate and pentyl 5-cyclopropylamino-Z-3-carboxylate from cyclopropylamine and pentyl D-2-carboxylate.

Isobutyl 3-dioctylamino-X-2-carboxylate and isobutyl 5-dioctylamino-Z-3-carboxylate from dioctylamine and isobutyl D-2-carboxylate.

The presently provided alkyl 3-hydrocarbylamino or 3-dihydrocarbylamino 5-norbornene-2-carboxylates (I) and the alkyl 5-hydrocarbylamino or 5-dihydrocarbylamino tricyclo-$[2.2.1.0^{2,6}]$-heptane-3-carboxylates (II) are stable compounds which range from viscous liquids to waxy or crystalline solids which are advantageously employed for a variety of industrial and agricultural purposes. Both the bicyclo olefinic compounds (I) and the tricyclo compounds (II) find use as vulcanization accelerators for rubber and both possess plant growth regulant effect. The olefinic compounds (I) are readily polymerizable and are especially useful in the preparation of synethetic, resinous copolymers with vinyl compounds such as styrene, methyl methacrylate, vinyl acetate, etc.

The invention is further illustrated by, but not limited to, thef ollowing examples:

Example 1

To a mixture consisting of 18.8 g. (0.125 mole) of methyl 2,5-norbornadiene-2-carboxylate and 50 ml. of benzene there was added dropwise 9.1 g. (0.125 mole) of diethylamine in 50 ml. of benzene. The whole was then refluxed for 12 hours. After distilling the benzene from the resulting reaction mixture, the residual mixture of adducts was fractionated to give 12.42 g. of a mixture of (A) methyl 3-diethylamino-5-norbornene-2-carboxylate and (B) methyl 5-diethylaminotricyclo[2.2.1.0$^{2,6}$]-heptane-3-carboxylate, B.P. 96–98° C./0.3 mm., $n_D^{25}$ 1.4824 and analyzing as follows:

|  | Found | Calc'd for $C_{13}H_{21}O_2N$ |
|---|---|---|
| Percent C | 70.21 | 69.92 |
| Percent H | 9.53 | 9.48 |
| Percent N | 6.08 | 6.27 |

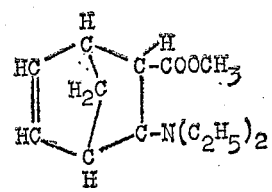

(A)

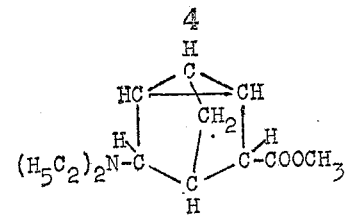

(B)

Example 2

A mixture consisting of 11.6 g. (0.125 mole) of aniline, 18.8 g. (0.125 mole) of methyl 2,5-norbornadiene-2-carboxylate and 100 ml. of glacial acetic acid was heated at reflux for 12 hours. The acetic acid was then removed from the resulting reaction mixture by distillation at water pump pressure to give as residue a mixture consisting essentially of methyl 5-phenylaminotricyclo-[2.2.1.0$^{2,6}$]heptane-3-carboxylate and methyl 3-phenylamino-5-norbornene-2-carboxylate.

What I claim is:

1. An alicyclic amino ester selected from the class consisting of 5-norbornene-2-carboxylates of the formula

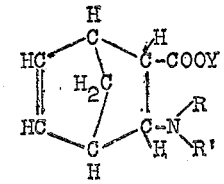

in which R is hydrocarbon which is free of olefinic and acetylenic unsaturation and contains from 1 to 8 carbon atoms, R' is selected from the class consisting of R and hydrogen, and Y is alkyl of from 1 to 5 carbon atoms, and a tricycloheptanecarboxylate of the formula

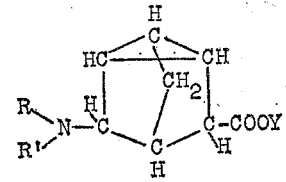

wherein R, R' and Y are as defined above.

2. Alkyl 3-hydrocarbonamino-5-norbornene-2-carboxylate wherein alkyl has form 1 to 5 carbon atoms and hydrocarbon is free of olefinic and acetylenic unsaturation and contains from 1 to 8 carbon atoms.

3. Alkyl 3-dihydrocarbonamino-5-norbornene-2-carboxylate wherein alkyl has from 1 to 5 carbon atoms and each hydrocarbon is free of olefinic and acetylenic unsaturation and contains from 1 to 8 carbon atoms.

4. Alkyl 5-hydrocarbonaminotricyclo[2.2.1.0$^{2,6}$]-heptane-3-carboxylate wherein alkyl has from 1 to 5 carbon atoms and hydrocarbon has from 1 to 8 carbon atoms and is free of olefinic and acetylenic unsaturation.

5. Alkyl 5-dihydrocarbonaminotricyclo[2.2.1.0$^{2,6}$]-heptane-3-carboxylate wherein alkyl has from 1 to 5 carbon atoms and each hydrocarbon has from 1 to 8 carbon atoms and is free of olefinic and acetylenic unsaturation.

6. The method which comprises refluxing, in the presence of an inert diluent, methyl 2,5-norbornadiene-2-carboxylate with diethylamine and recovering methyl 3-diethylamino-5-norbornene-2-carboxylate from the resulting reaction product.

7. The method which comprises refluxing, in the presence of an inert diluent, methyl 2,5-norbornadiene-2-carboxylate with diethylamine and recovering methyl 5-diethylaminotricyclo[2.2.1.0$^{2,6}$]heptane-3-carboxylate from the resulting reaction product.

8. The method which comprises refluxing, in the presence of an inert diluent, aniline with methyl 2,5-norbornadiene-2-carboxylate and recovering methyl 5-phenylaminotricyclo[2.2.1.0²,⁶]heptane-3-carboxylate from the resulting reaction product.

9. The method which comprises refluxing, in the presence of an inert diluent, aniline with methyl 2,5-norbornadiene-2-carboxylate and recovering methyl 3-phenylamino-5-norbornene-2-carboxylate from the resulting reaction product.

10. The method which comprises refluxing, in the presence of an inert diluent, alkyl 2,5-norbornadiene-2-carboxylate in which alkyl has from 1 to 5 carbon atoms with an amino compound of the formula

in which R is hydrocarbon which is free of olefinic and acetylenic unsaturation and contains from 1 to 8 carbon atoms and R' is selected from the class consisting of R and hydrogen, and recovering from the resulting reaction product an alicyclic amino ester selected from the class consisting of norbornene compounds of the formula

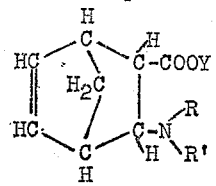

and tricycloheptane compounds of the formula

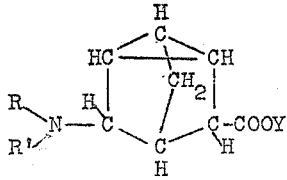

in which R and R' are as defined above and Y is alkyl of from 1 to 5 carbon atoms.

11. The method which comprises refluxing, in the presence of an inert diluent, alkyl 2,5-norbornadiene-2-carboxylate having from 1 to 5 carbon atoms in alkyl with a hydrocarbonamine wherein hydrocarbon is free of olefinic and acetylenic unsaturation and contains from 1 to 8 carbon atoms to obtain a mixture of alkyl 3-hydrocarbonamino-5-norbornene-2-carboxylate and alkyl 5-hydrocarbonaminotricyclo[2.2.1.0²,⁶]heptane-3 - carboxylate wherein alkyl and hydrocarbon are as defined above.

12. The method which comprises refluxing, in the presence of an inert diluent, alkyl 2,5-norbornadiene-2-carboxylate having from 1 to 5 carbon atoms in alkyl with a dihydrocarbonamine wherein each hydrocarbon is free of olefinic and acetylenic unsaturation and contains from 1 to 8 carbon atoms to obtain a mixture of alkyl 3-dihydrocarbonamino-5-norbornene-2-carboxylate and alkyl 5 - dihydrocarbonaminotricyclo[2.2.1.0²,⁶]heptane-3-carboxylate wherein alkyl and hydrocarbon are as defined above.

13. The method which comprises refluxing, in the presence of an inert diluent, methyl 2,5-norbornadiene-2-carboxylate with diethylamine and recovering a mixture of methyl 3-diethylamino-5 - norbornene - 2-carboxylate and methyl 5-diethylaminotricyclo[2.2.1.0²,⁶]heptane-3-carboxylate from the resulting reaction product.

14. The method which comprises refluxing, in the presence of an inert diluent, methyl 2,5-norbornadiene-2-carboxylate with aniline to obtain a mixture of methyl 5-phenylaminotricyclo[2.2.1.0²,⁶]heptane - 3 - carboxylate and methyl 3-phenylamino-5-norbornene-2-carboxylate.

References Cited in the file of this patent
UNITED STATES PATENTS 2,730,548    Bluestone et al. _____ Jan. 10, 1956

OTHER REFERENCES

Hackh's Chemical Dictionary, third ed. (Philadelphia, 1944), p. 714.

Fuson: Advanced Organic Chemistry, pages 471–472, John Wiley and Sons, New York, 1950.